US012756320B2

(12) United States Patent
Cohen

(10) Patent No.: US 12,756,320 B2
(45) Date of Patent: Oct. 6, 2026

(54) VOLTAGE BALANCING IN HALF-BRIDGE VOLTAGE CONVERTER

(71) Applicant: TEXAS INSTRUMENTS INCORPORATED, Dallas, TX (US)

(72) Inventor: Isaac Cohen, Dix Hills, NY (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 261 days.

(21) Appl. No.: 18/050,203

(22) Filed: Oct. 27, 2022

(65) Prior Publication Data

US 2024/0146199 A1 May 2, 2024

(51) Int. Cl.
*H02M 3/335* (2006.01)

(52) U.S. Cl.
CPC ... *H02M 3/33571* (2021.05); *H02M 3/33515* (2013.01)

(58) Field of Classification Search
CPC ............. H02M 3/335; H02M 3/33571; H02M 3/33515; H02M 1/0003
See application file for complete search history.

(56) References Cited

U.S. PATENT DOCUMENTS

| | | | | |
|---|---|---|---|---|
| 4,631,653 A | | 12/1986 | Small | |
| 4,931,716 A | * | 6/1990 | Jovanovic | H02M 3/33576 323/224 |
| 5,289,601 A | | 3/1994 | LaBianco | |
| 5,602,464 A | * | 2/1997 | Linkowsky | G05F 3/22 323/224 |
| 6,577,183 B1 | * | 6/2003 | Nakamura | H03F 3/45188 327/307 |
| 9,130,456 B2 | * | 9/2015 | Yu | H02M 3/158 |
| 2004/0257056 A1 | * | 12/2004 | Huang | H02M 3/1588 323/282 |
| 2010/0264895 A1 | * | 10/2010 | Weng | H02M 3/1588 323/285 |
| 2012/0013321 A1 | * | 1/2012 | Huang | H02M 3/33507 323/282 |
| 2014/0347029 A1 | | 11/2014 | Daub | |

(Continued)

OTHER PUBLICATIONS

Songquan Deng, et al, "A New Peak Current Mode Control Scheme for Half-Bridge DC-DC Converters," 2004 35th Annual IEEE Power Electronics Specialists Conference, 2004, p. 3734-3738.

(Continued)

*Primary Examiner* — Gary L Laxton
(74) *Attorney, Agent, or Firm* — Charles F. Koch

(57) ABSTRACT

A controller for a voltage converter includes a current mode control circuit having an input. The controller includes a voltage imbalance correction circuit, which includes a subtractor configured to subtract a first voltage from a second voltage to produce a third voltage. The controller also includes a transconductance circuit coupled to the subtractor. The transconductance circuit has a current output and is configured to produce a current on the current output that is proportional to the third voltage. A capacitor is coupled to the current output and configured. The capacitor is configured to be charged by the current from the current output to produce a ramp voltage. The ramp voltage is configured to control, at least in part, the current mode control circuit.

20 Claims, 4 Drawing Sheets

(56) References Cited

U.S. PATENT DOCUMENTS

2016/0301303 A1* 10/2016 Bari ...................... H02M 3/156

OTHER PUBLICATIONS

Roasto I et al: "Analysis of capacitor-related mid-voltage point shift problems in high-voltage half-bridge DC/DC converters," Power Electronics Specialists Conference, PESC, IEEE, Piscataway, NJ, USA, Jun. 15, 2008.

Rossetto L et al: "Design considerations on current-mode and voltage-mode control methods for half-bridge converters," Applied Power Electronics Conference and Exposition, 1997, APEC '97 Conference Proceedings 1997, Twelfth Annual Atlanta, GA, USA Feb. 23-27, 1997, New York, NY, USA, IEEE, US.

International Search Report dated Feb. 21, 2024.

* cited by examiner

VOLTAGE BALANCING IN HALF-BRIDGE VOLTAGE CONVERTER

BACKGROUND

One type of voltage converter is a half-bridge voltage converter, A half-bridge voltage includes a pair of transistors coupled to a primary winding of a transformer. A pair of capacitors is coupled in series between the input voltage and a ground terminal Nominally, the voltage on the connection between the capacitors is one-half of the input voltage. In current mode control of a half-bridge voltage converter, a slight deviation in the voltage on the connection between the capacitors from one-half of the input voltage can lead to larger and larger deviations of that voltage, the point at which the voltage converter is no longer usable to produce a regulated output voltage.

SUMMARY

In one example, A controller for a voltage converter includes a current mode control circuit having an input. The controller includes a voltage imbalance correction circuit, which includes a subtractor configured to subtract a first voltage from a second voltage to produce a third voltage. The controller also includes a transconductance circuit coupled to the subtractor. The transconductance circuit has a current output and is configured to produce a current on the current output that is proportional to the third voltage. A capacitor is coupled to the current output and configured. The capacitor is configured to be charged by the current from the current output to produce a ramp voltage. The ramp voltage is configured to control, at least in part, the current mode control circuit.

DETAILED DESCRIPTION

Figure 1:
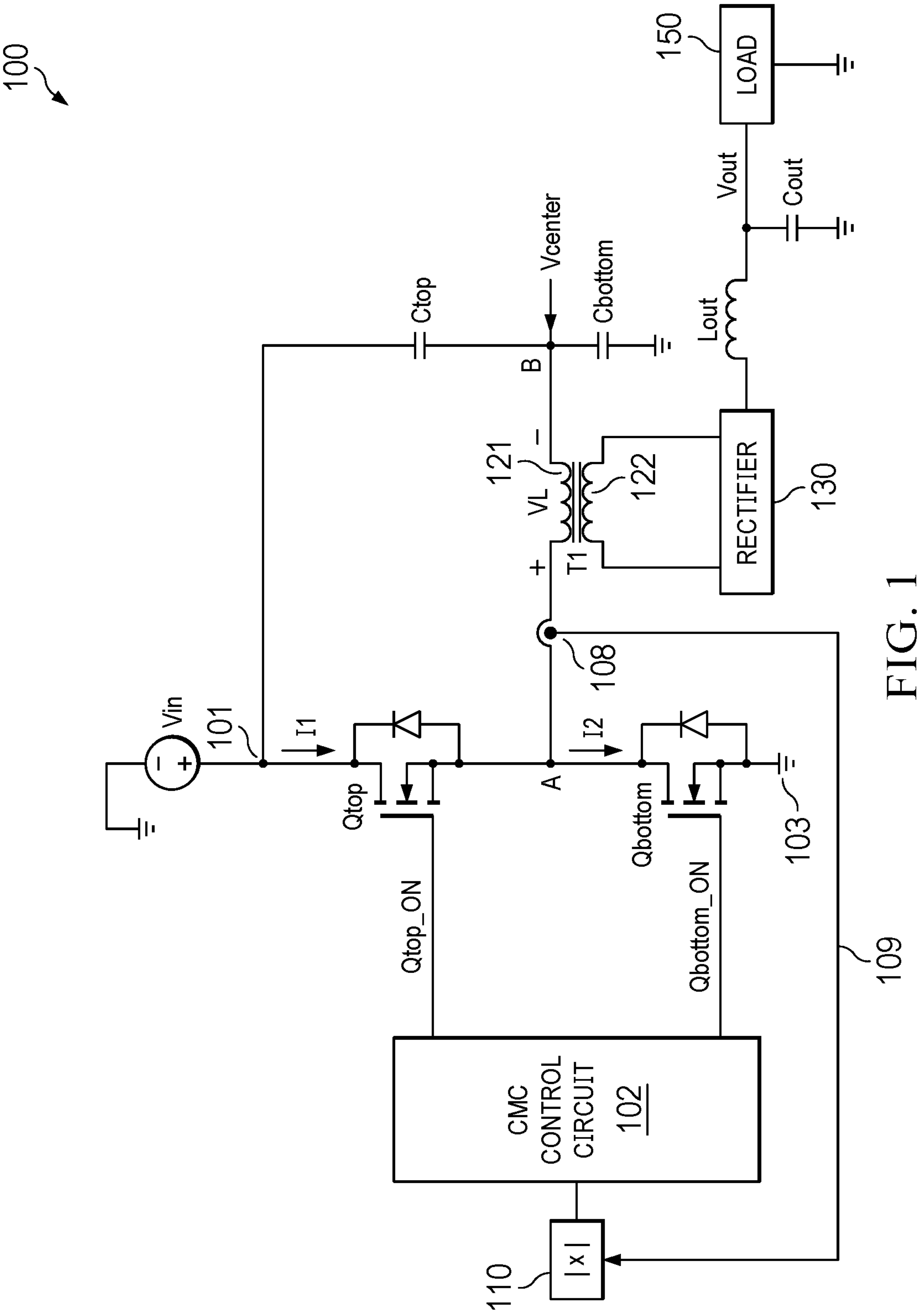
FIG. 1 is a schematic of a half-bridge voltage converter, in accordance with an example.

The same reference numbers or other reference designators are used in the drawings to designate the same or similar (either by function and/or structure) features.

FIG. 1 is a schematic of an example half-bridge voltage converter 100 which includes transistors Qtop and Qbottom, a transformer T1, capacitors Ctop and Cbottom, a peak current mode control (CMC) controller 102, a current sense circuit 108, a scaling circuit 110, a rectifier 130, an output inductor Lout, and an output capacitor Cout. The voltage converter 100 converts an input voltage, Vin, into an output voltage, Vout which powers a load 150.

In this example, the transistors Qtop and Qbottom are n-channel field effect transistors (NFETs) but can be implemented as other types of transistors as desired. The drain of transistor Qtop is coupled to the input voltage terminal 101 to receive Vin. The source of transistor Qtop is coupled to the drain of transistor Qbottom at node A. The source of transistor Qbottom is coupled to a ground terminal 103. Transistors Qtop and Qbottom are thus coupled in series between Vin and ground.

Similarly, capacitors Ctop and Cbottom are coupled in series between Vin and ground. The connection between capacitors Ctop and Cbottom is node B. In one example, the capacitance of Ctop is approximately equal to the capacitance of Cbottom. Transformer T1 includes a primary winding 121 and a secondary winding 122. The primary winding is coupled between nodes A and B.

The peak CMC controller 102 produces output signals Qtop_ON and Qbottom_ON that are coupled to the gates of the respective transistors Qtop and Qbottom. The peak CMC controller 102 turns ON one transistor or the other (or neither) at any point in time. The peak CMC controller 102 does not cause both transistors to be ON at the same time to avoid a shoot-through condition from Vin to ground through the transistors. Current sense circuit 108 produces a signal 109 (e.g., a voltage) that is proportional to the current through whichever of the transistors Qtop or Qbottom are ON at any point in time. Scaling circuit 110 scales down (or up) the current sense circuit's output voltage and provides the scaled voltage to the peak CMC controller 102. The peak CMC controller 102 turns ON transistor Qtop and then turns it OFF responsive to the signal 109 reaching an upper threshold. Similarly, the peak CMC controller 102 turns ON transistor Qbottom and then turns it OFF responsive to the signal 109 reaching the same upper threshold. Thus, each transistor is separately turned ON until its current reaches the upper threshold.

The voltage on node A is approximately Vin responsive to transistor Qtop being ON. The voltage on node A is approximately 0 V response to transistor Qbottom being. Nominally, the voltage on node B is Vin/2. Accordingly, the voltage VL across the primary winding 121 of transformer T1 is either +Vin/2 or −Vin/2 depending on which transistor Qtop or Qbottom is ON at any point in time. The current through an inductor increases or decreases approximately linearly when a fixed voltage is applied to it. Accordingly, the current I1 through transistor Qtop increases linearly in response to transistor Qtop being turned ON by the peak CMC controller 102, and the current I2 (albeit in the opposite direction as current I1) through the transistor Qbottom increases linearly in response to transistor Qbottom being turned ON by the peak CMC controller 102. If the voltage on node B (Vcenter) is approximately Vin/2, the absolute value of voltage VL will be approximately the same in each half cycle (in one half-cycle, Qtop is ON and in the other half-cycle, Qbottom is ON). In this state (Vcenter being approximately Vin/2), the rates of change of currents I1 and I2 will be approximately equal.

However, if voltage Vcenter deviates from Vin/2, then the voltage VL will be larger in one half-cycle than in the other half-cycle, and accordingly, the rates of change of currents I1 and I2 will be unequal. For a peak current mode control of a half-bridge voltage converter, it will take different amounts time for current I1 and I2 to reach the threshold current. Accordingly, in the half-cycle that the rate of change of the current (I1 or I2) is lower, the transistor (Qtop or Qbottom) implementing that particular half-cycle will be ON longer than the other transistor will be ON in the opposing half-cycle. That the half-cycles have different time durations may lead to a "run-away" condition in which the voltage Vcenter continues to increase (or decrease) in the same direction until eventually voltage Vcenter becomes approximately Vin or ground and remains at that voltage.

The embodiments described herein are directed to a voltage imbalance correction circuit that generates a signal that indicates the magnitude of the difference between the voltage on node B (Vcenter) and what that voltage nominally should be, which is Vin/2. The voltage imbalance correction circuit determines an error voltage approximately equal to (Vin/2-Vcenter), converts the error voltage to an error current, and charges a capacitor using the error current. The voltage on the capacitor increases (ramps up) at an approximately linear rate, which is a function of the error current and thus a function of the error voltage. A summer then adds the voltage ramp to the signal from the current sense circuit. The CMC control circuit uses the summed signal to determine when to turn OFF the Qbottom or Qtop transistor that is otherwise staying ON too long due to the voltage imbalance. The summed signal causes the CMC control circuit to determine that the threshold current has been reached sooner than otherwise would have been the case absent the voltage ramp. The overall effect is that that the voltage on node B (Vcenter) remains at its target level of approximately Vin/2.

Figure 2:
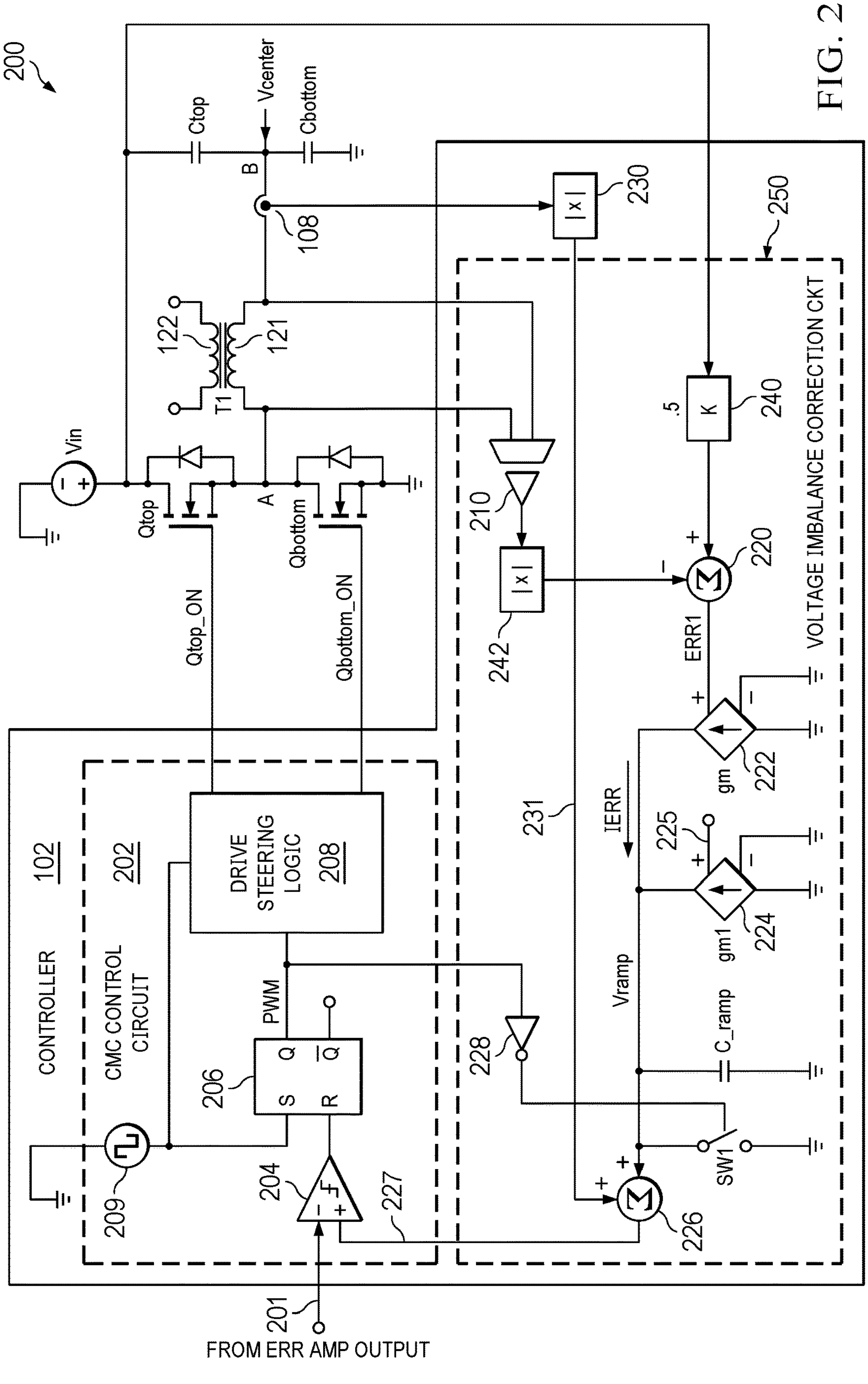
FIG. 2 is a schematic of a half-bridge voltage converter in accordance with another example which includes a voltage imbalance correction circuit to help maintain the capacitors' one-half input voltage relatively constant.

FIG. 2 is a schematic of a half-bridge voltage converter 200, in accordance with another embodiment. The voltage converter 200 in the example of FIG. 2 includes the transistors Qtop and Qbottom, the transformer T1 (which includes primary coil 121 and secondary coil 122), capacitors Ctop and Cbottom, a CMC control circuit 202, and a voltage imbalance correction circuit 250. As described above, transistors Qtop and Qbottom are coupled in series between Vin and ground. Similarly, capacitors Ctop and Cbottom are coupled in series between Vin and ground. The primary winding 121 of the transformer T1 is coupled between nodes A and B. The rectifier 130, output inductor Lout, and output capacitor Cout are not shown for simplicity, but those components or another configuration of components is present and coupled to the secondary winding 122.

The CMC control circuit 202 includes a comparator 204, a set-reset (SR) flip-flop 206, and drive steering logic 208. The comparator has a negative (inverting, −) input and a positive (non-inverting, +) input. In this example, a signal 201 from an error amplifier (not shown) is coupled to the negative input of comparator 204. The positive input of the comparator is coupled to an output of a summer 226 of the voltage imbalance correction circuit 250 (described below). Responsive to a signal 227 from the summer 226 exceeding signal 201, the comparator's output is activated logic high. The output of the comparator 204 is coupled to the reset (R) of the flip-flop 206. When the R input is asserted logic high, the flip-flop 206 forces its Q output to be logic low. The signal from the Q output of the flip-flop is a pulse width modulation (PWM) signal, which is logic low when the flip-flop is reset and is logic high when the flip-flop is set. The flip-flop 206 is set upon receipt of rising edge on the set (S) input from a clock 209. The PWM signal output by the comparator 206 and provided to the drive steering logic 208 toggles between logic low and logic high.

The drive steering logic 208 splits the PWM pulses sequentially between the Qtop and Qbottom transistors. One pulse of PWM causes the drive steering logic 208 to force Qtop_ON high to turn ON transistor Qtop. Then, the next PWM pulse causes the drive steering logic 208 to force Qbottom_ON high to turn ON transistor Qbottom, and so forth.

The voltage imbalance correction circuit 250 includes a transformer voltage sensor 210, a subtractor 220, transconductance circuits 222 and 224, an adder 226, a capacitor C_ramp, a switch SW1, and an inverter 228. In one example, the transformer voltage sensor 210 may be implemented as a winding on the transformer. The input to the transformer voltage sensor 210 is coupled to opposing terminals of the transformer's primary winding 121. The output of the transformer voltage sensor 210 is a voltage that is approximately equal to the voltage across the primary winding 121. The output of the transformer voltage sensor 210 is coupled to the negative input of the subtractor 220 via an absolute value circuit 242. The absolute value circuit 242 provides a positive transformer voltage sensor output voltage (positive with respect to ground) to the subtractor. The absolute value circuit converts a negative transformer voltage sensor output voltage to a positive voltage and provides such positive voltage to the subtractor 220.

The input voltage Vin is coupled to a scaling circuit 240, which scales down Vin by a factor of K. In one example, K is 0.5, and thus the output voltage from the scaling circuit 250 is approximately Vin/2. The scaled output voltage from the scaling circuit 242 is provided to the positive input of the subtractor 220.

The subtractor 220 produces an output voltage (ERR1) that is the difference between the scaled voltage and the absolute value of the primary winding's voltage. As described above, if Vcenter is approximately equal to Vin/2, then the absolute value of the voltage across the primary winding 121 (which is provided to the subtractor's negative input) is approximately Vin/2. With a K factor of 0.5, the voltage on the positive input of the subtractor 220 also is approximately Vin/2. Accordingly, the voltage magnitude of ERR1 should be approximately 0V if Vcenter is approximately Vin/2. As described below, if Vcenter deviates from Vin/2, the magnitude of ERR1 will be a function of the difference between what Vcenter nominally should be (Vin/2) and what Vcenter actually is. The actual voltage magnitude of Vcenter is represented by the voltage across the primary winding 121.

The transconductance circuit 222 converts the voltage of ERR1 to a current, IERR. The magnitude of IERR is a proportional to the voltage magnitude of ERR1 (IERR=gm*ERR1, where gm is the transconductance of the transconductance circuit 222). Thus, IERR is proportional to the difference between the target magnitude of Vcenter (Vin/2) and the actual magnitude of Vcenter (which may deviate from Vin/2 due to the imbalance described above).

The current IERR from the transconductance circuit 222 is provided to capacitor C_ramp to thereby charge the capacitor. The voltage across the capacitor is designated Vramp is a linearly increasing voltage. The rate at which Vramp increases with respect to time is a function of the magnitude of current IERR as well as the capacitance of capacitor C_ramp.

Vramp is coupled to one input of summer 226. Absolute value circuit 230 receives a voltage from current sense circuit 108 indicative of the current through whichever transistor is ON in any given half-cycle. That voltage is rectified by absolute value circuit 230 and provided as primary current sense voltage 231 to the other input of summer 226. Summer 226 adds Vramp to the primary current sense voltage 231. As described above, if Vcenter deviates from Vin/2, one of the transistor's Qtop or Qbottom will stay on longer during its half-cycle than the other transistor in its half-cycle. By adding Vramp to the primary current sense voltage 231, the comparator 204 will trip sooner than if Vramp was not included. The output signal of comparator 204 will transition from logic low to logic high sooner than would otherwise be the case. Upon the output signal of comparator 204 becoming logic high, the SR flip-flop 206 will be reset and the PWM signal will be forced low thereby terminating whichever of the Qtop or Qbottom transistors was ON at that moment. Accordingly, the voltage Vramp controls, at least in part, the operation of the COM control circuit 202.

Under a worst-case scenario of a voltage imbalance, one of the capacitors Ctop or Cbottom is charged to Vin and the other capacitor is completely discharged. Because no current flows through the transistor Qtop or Qbottom associated with the completely discharged capacitor, the equation for the value of the conductance (gm) of transconductance circuit 222 may be given, in one example, as:

$$gm = \frac{40 * \text{C\_ramp} * Ipkref}{Tsw * \text{Vin\_min}} \tag{1}$$

where Ipkref is the current threshold of the peak current mode control, Tsw is the switching period, and Vin_min is the smallest permitted magnitude of Vin for which the converter is rated. Equation (1) provides the relationship between gm, C_ramp, Ipkref, Tsw, and Vin_min, and this relationship can be used to select or calculate these values.

The inverter 228 inverts the PWM signal to control the ON/OFF state of switch SW1. Switch SW1 closes in response to PWM being logic low, and is open otherwise (PWM being logic high). When switch SW1 closes, capacitor C_ramp discharges to begin a new switching cycle and to generate another ramp voltage, Vramp, as necessary (if Vcenter has deviated from Vin/2). The Qbar output of the flip-flop 206 could be used to control the ON/OFF state of switch SW1, in which case the inverter 228 need not be included.

The voltage imbalance correction circuit 250 also includes a transconductance circuit 224, which may be useful for slope compensation, particularly when operating at a duty cycle greater than 50%. The transconductance circuit 224 converts an input voltage controlled by a slope compensation programming signal 225 (which may be received, for example, from a programming register or other type of programming technique) to a slope compensation current, which is added to IERR. The combined current (IERR plus the slope compensation current from the transconductance circuit 224) charges capacitor C_ramp. Accordingly, Vramp includes both slope compensation and a voltage ramp to help reduce the voltage imbalance on node B.

Figure 3:
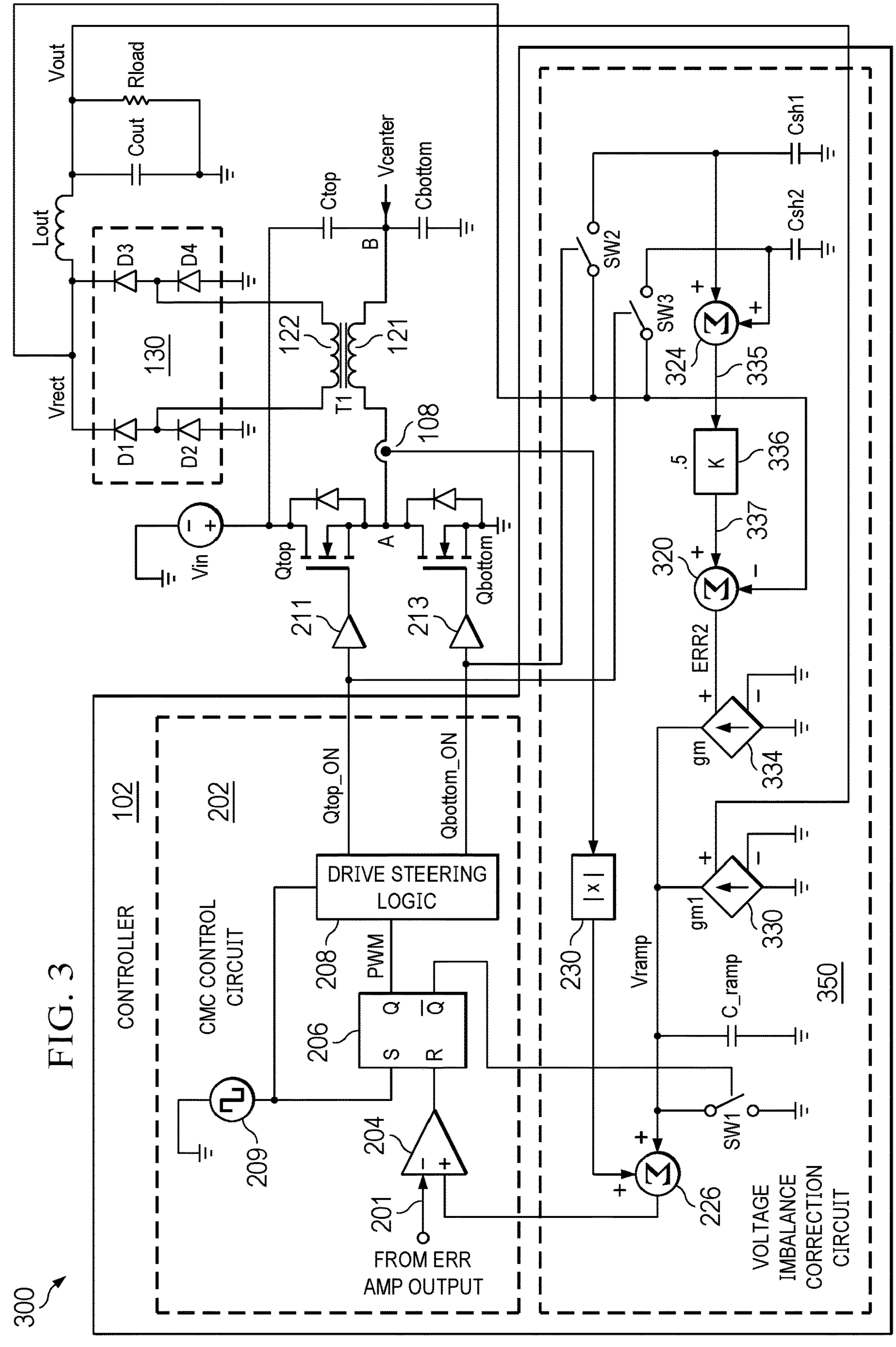
FIG. 3 is a schematic of another half-bridge converter which taps the voltage across the secondary winding of the transformer and also includes a voltage imbalance correction circuit to prevent the capacitor's voltage from substantially deviating from one-half of the input voltage, in accordance with another example.

FIG. 3 is a schematic of an example half-bridge voltage converter 300 which includes a voltage imbalance correction circuit 350 that monitors the voltage across the secondary winding 122 of transformer T1 instead of the voltage across the primary winding 121 (as was the case of the half-bridge converter 200 of FIG. 2.). The half-bridge converter 300 includes the transistors Qtop and Qbottom, the transformer T1, capacitors Ctop and Cbottom, a CMC control circuit 202, and a voltage imbalance correction circuit 350. As described above, transistors Qtop and Qbottom are coupled in series between Vin and ground. Similarly, capacitors Ctop and Cbottom are coupled in series between Vin and ground. The primary winding 121 of the transformer T1 is coupled between nodes A and B. In this example, rectifier 130 is a full-bridge rectifier including diodes D1, D2, D3, and D4, as shown. The rectified voltage from the secondary winding 122 is labeled Vrect and is provided to one terminal of the output inductor Lout. The rectified secondary winding voltage, Vrect, is also provided as input voltage to the voltage imbalance correction circuit 350.

The voltage imbalance correction circuit 350 includes the summer 226, switch SW1, absolute value circuit 230, and capacitor C_ramp, as described above. The voltage imbalance correction circuit 350 also includes transconductance circuits 330 and 334, subtractor 320, added 324, capacitors Csh1 and Csh2, switches SW2 and SW3, and scaling circuit 336. The control signal to switch SW2 is the Qtop_ON signal, and the control signal to switch SW3 is the Qbottom_ON signal. Voltage Vrect is provided to a terminal of both switches SW2 and SW3, and the other terminal of the switches is coupled to a respective capacitor Csh1 and Csh2, as shown. When switch SW2 is closed, Vrect charges capacitor Csh1 to a voltage approximately equal to Vrect. Similarly, when switch SW3 is closed, Vrect charges capacitor Csh2 to a voltage approximately equal to Vrect. The sum of Vrect obtained during respective half-cycles is approximately equal to Vin divided by the turns ratio N of the transformer 122. Capacitors Csh1 and Csh2 thus hold the voltage of Vrect during each respective half-cycle. Summer 324 adds together the voltages from capacitors Csh1 and Csh2 to generate a voltage 225 that is approximately equal to Vin divided by the turns ratio of the transformer 122. The scaling circuit 336 applies a scaling factor K (e.g., 0.5 divided by the turns ratio N of the transformer) to produce a voltage 337 that nominally is proportional to Vin/2 divided by the turns ratio N of the transformer 122.

Subtractor determines Vrect minus the voltage 337 (Vrect−Vin/2*N) to produce error voltage ERR2. ERR2 is converted to a corresponding error current by transconductance circuit 334, as described above for transconductance circuit 222. Transconductance circuit 334 converts Vout to a current. The currents from the transconductance circuits 330 and 334 add together to charge capacitor C_ramp to produce the voltage ramp, Vramp. Summer 226 adds the voltage ramp Vramp to the absolute value of the current sense voltage, and the output of the summer 226 is provided to the positive input of the comparator 204 within the CMC control circuit 202.

Figure 4:
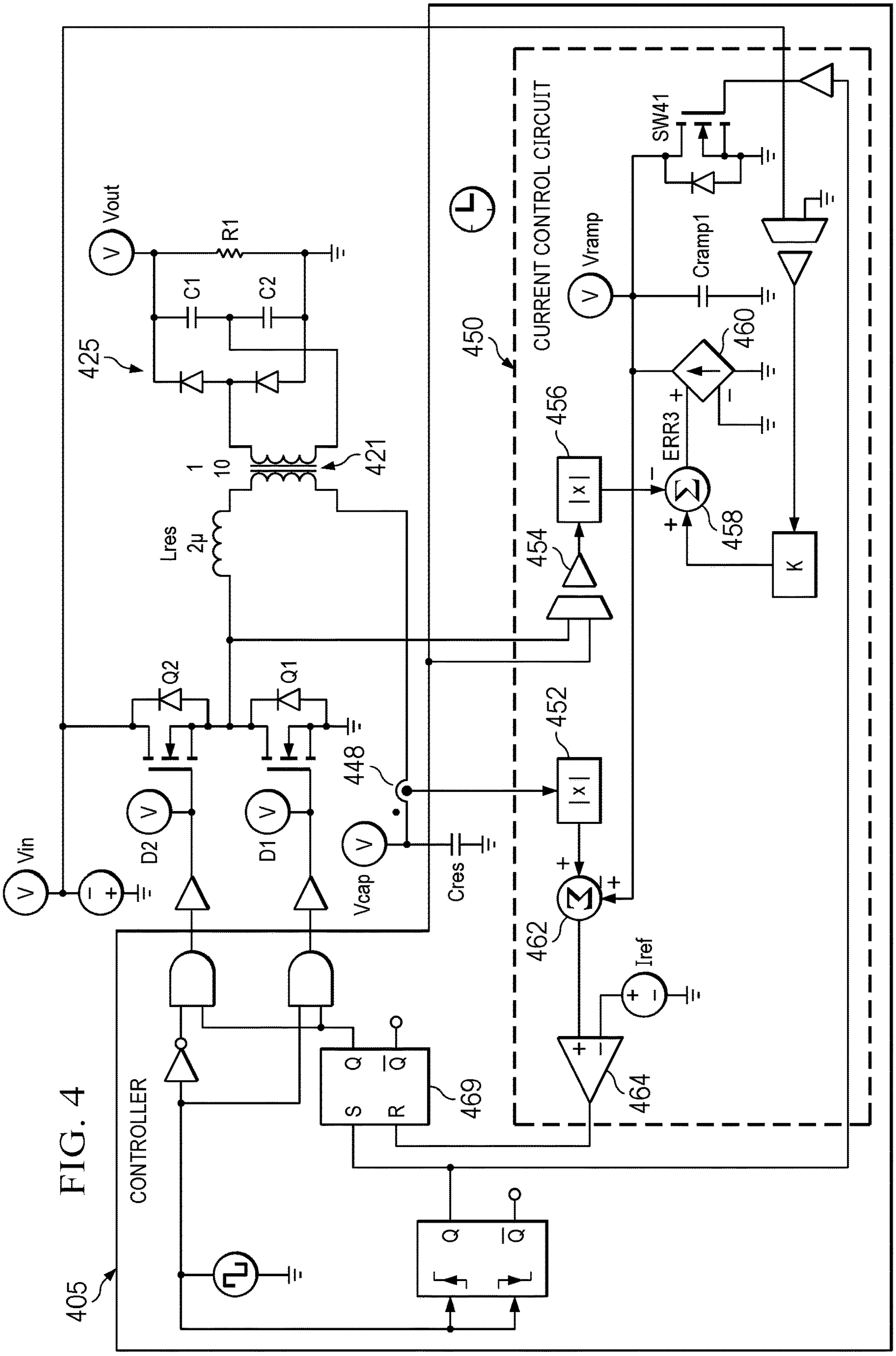
FIG. 4 is a schematic of series resonant, half-bridge converter that includes a voltage imbalance correction circuit, in accordance with another example.

Other voltage converter topologies may benefit from the principles described herein. FIG. 4 is a schematic illustrating an example of a half-bridge, series resonant converter 400, which uses the principles described above during a possible overload condition. The series resonant converter of FIG. 4 includes a controller 405, which includes a current control circuit 450. In a series resonant converter, such as series resonant converter 400, transistors Q2 and Q1 are connected in series between Vin and ground and are reciprocally operated at approximately a 50% duty cycle. A resonant tank circuit includes inductor Lres and capacitor Cres, which has a particular resonant frequency. The switching frequency of transistors Q1 and Q2 is set to approximately the resonant frequency. The switch node between transistors Q1 and Q2 is coupled through inductor Lres to a transformer 421. A rectifier circuit 425 produces the output voltage Vout.

The voltage across capacitor Cres should remain approximately equal to Vin/2. However, if an overload condition is present, the current through one or both of the transistors Q1 and Q2 may become excessive. Increasing the switching frequency of the transistors Q1 and Q2 may help to reduce the current but an excessively large switching frequency may be needed for this reason. Instead, current control circuit 450 functions much the same as described above for the voltage imbalance correction circuit 250 to prematurely terminate the conduction of one of the transistors Q1 and Q2. A current sensor 448 provides a signal (e.g., a voltage) to an absolute value circuit 452, and the output of the absolute value circuit 452 is added to a ramp voltage (Vramp) by summer 462. A comparator 464 compares the sum of the current signal from the absolute value circuit 452 and Vramp to a reference signal, Iref. If the summed value exceeds Iref, the output of the comparator resets a flip-flop 469 within the controller 410. The Q output of flip-flop 469 is forced low thereby turning OFF whichever transistor Q1 or Q2 was ON at that moment and ensuring that transistor's current remains at a safe level.

Voltage sensor 454 senses the voltage between the switch node and the voltage across the capacitor (that voltage difference should be Vin/2). The sensed voltage is applied through an absolute value circuit 456 to one input of a subtractor 458. A scaled (by a factor of one-half) version of Vin is applied to the other input of subtractor 458. The subtractor 458 subtracts the sensed voltage from voltage sensor 454 (which should be Vin/2) from the scaled Vin (Vin/2) to produce an error signal ERR3. A transconductance circuit 460 converts the voltage ERR3 to a current to charge a capacitor, Cramp1, to produce the ramp voltage Vramp. Switch SW41 discharges capacitor Cramp1 for each switching cycle as described above.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead with little or no change to the remaining circuitry. For example, a field effect transistor ("FET") (such as an n-channel FET (NFET) or a p-channel FET (PFET)), a bipolar junction transistor (BJT—e.g., NPN transistor or PNP transistor), insulated gate bipolar transistors (IGBTs), and/or junction field effect transistor (JFET) may be used in place of or in conjunction with the devices disclosed herein. The transistors may be depletion mode devices, drain-extended devices, enhancement mode devices, natural transistors or other types of device structure transistors. Furthermore, the devices may be implemented in/over a silicon substrate (Si), a silicon carbide substrate (SiC), a gallium nitride substrate (GaN) or a gallium arsenide substrate (GaAs).

References may be made in the claims to a transistor's control input and its current terminals. In the context of a FET, the control input is the gate, and the current terminals are the drain and source. In the context of a BJT, the control input is the base, and the current terminals are the collector and emitter.

References herein to a FET being "on" means that the conduction channel of the FET is present and drain current may flow through the FET. References herein to a FET being "off" means that the conduction channel is not present and drain current does not flow through the FET. An "off" FET, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter.

Modifications are possible in the described embodiments, and other embodiments are possible, within the scope of the claims.

What is claimed is:

1. A circuit comprising:

an amplifier having a first input, a second input, and an output, the first input of the amplifier coupled to an inductor terminal;

a ramp generator having an output and a ramp slope control input, the ramp slope control input coupled to the output of the amplifier; and a summer having a first input, a second input, and an output, the first input of the summer coupled to the output of the ramp generator, and the second input of the summer coupled to a current sense input, the summer configurable to generate a first signal at the output based on adding a second signal at the first input and a third signal at the second input.

2. The circuit of claim 1, wherein the amplifier is a first amplifier, and the circuit further comprises a second amplifier having a first input and a second input, the first input of the second amplifier coupled to the output of the summer.

3. The circuit of claim 1, further comprising:

a scaling circuit coupled between a power terminal and the second input of the amplifier.

4. The circuit of claim 1, wherein the amplifier is configurable to provide a positive voltage or a 0 voltage, but not a negative voltage.

5. The circuit of claim 1, wherein the inductor terminal is coupled to a primary winding of a transformer.

6. The circuit of claim 1, wherein the inductor terminal is coupled to a secondary winding of a transformer.

7. The circuit of claim 6, wherein the summer is a first summer, and the circuit further comprises:

a first switch;

a first capacitor coupled to the first switch;

a second switch;

a second capacitor coupled to the second switch; and a second summer having an output, a first input, and a second input, the first input of the second summer is coupled to the first capacitor, the second input of the second summer is coupled to the second capacitor.

8. The circuit of claim 1, further comprising a power stage having an input coupled to the output of the summer, the power stage being part of a half bridge converter or a series resonant half bridge converter.

9. The circuit of claim 1, wherein the ramp generator includes a transconductance amplifier having an input coupled to the ramp slope control input, and a capacitor coupled to the output of the ramp generator.

10. The circuit of claim 1, further comprising a pulse width modulator circuit having an input coupled to the output of the summer.

11. A circuit comprising: p1 an amplifier having a first input, a second input, and an output, the first input of the amplifier coupled to a capacitor terminal:

a ramp generator having an output and a ramp slope control input, the ramp slope control input coupled to the output of the amplifier; and a summer having a first input, a second input, and an output, the first input of the summer coupled to the output of the ramp generator, and the second input of the summer coupled to a current sense input, the summer configurable to generate a first signal at the output based on adding a second signal at the first input and a third signal at the second input.

12. The circuit of claim 11, wherein the amplifier is a first amplifier, and the circuit includes a second amplifier having a first input and a second input, the first input of the second amplifier coupled to the output of the summer.

13. The circuit of claim 9, wherein the summer is a first summer, and the voltage circuit further comprises:

a first switch;

a first capacitor coupled to the first switch;

a second switch;

a second capacitor coupled to the second switch; and a second summer having an output, a first input, and a second input, the first input of the second summer coupled to the first capacitor, the second input of the second summer is coupled to the second capacitor.

14. The circuit of claim 13, further comprising a rectifier circuit, wherein the first and second switches are coupled to an output of the rectifier circuit.

15. The circuit of claim 13, further comprising a voltage generator having an output coupled to the second input of the second summer, the voltage generator configurable to provide a first voltage based on a second voltage at a power terminal divided by a turn ratio of a transformer.

16. The circuit of claim 11, wherein the the amplifier is configurable to provide a voltage that is either zero or positive.

17. The circuit of claim 11, wherein the first input of the amplifier is coupled to a transformer terminal.

18. The circuit of claim 11, further comprising a power stage having an input coupled to the output of the summer, the power stage being part of a half bridge converter or a series resonant half bridge converter.

19. A voltage converter, comprising:

a power stage having a control input and an output;

a transformer, the transformer including a primary side winding and a secondary side winding, the primary side winding coupled to the output of the power stage;

an amplifier having a first input, a second input, and an output, the first input of the amplifier coupled to one of the primary side winding or the secondary side winding;

a ramp generator having an output and a ramp slope control input, the ramp slope control input coupled to the output of the amplifier; and a summer having a first input, a second input, and an output, the first input of the summer coupled to the output of the ramp generator, and the second input of the summer coupled to a current sense input, the summer configurable to generate a first signal at the output based on adding a second signal at the first input and a third signal at the second input.

20. The voltage converter of claim 19, wherein the amplifier is a first amplifier, and the voltage converter includes a second amplifier having an output, a first input, and a second input, the first input coupled to the output of the summer, the output of the second amplifier coupled to the control input of the power stage.

* * * * *